United States Patent [19]

Bracke

[11] 4,093,790

[45] June 6, 1978

[54] POLYPHENYLENE RESINS

[75] Inventor: William J. I. Bracke, Brussels, Belgium

[73] Assignee: Labofina S.A., Brussels, Belgium

[21] Appl. No.: 215,465

[22] Filed: Jan. 5, 1972

[30] Foreign Application Priority Data

Apr. 14, 1971 France .................. 71.13111

[51] Int. Cl.$^2$ ............................................. C08F 38/00
[52] U.S. Cl. .................... 526/144; 526/158; 526/159; 526/285
[58] Field of Search ................ 260/94.1, 88.2 D, 2 H; 526/144, 158, 159, 285

[56] References Cited

U.S. PATENT DOCUMENTS

| 3,066,119 | 11/1962 | Meriwether | 260/88.2 |
|---|---|---|---|
| 3,313,787 | 4/1967 | Valvassori | 260/79.5 |
| 3,316,233 | 4/1967 | Feay | 260/93.7 |
| 3,578,626 | 5/1971 | Kornicker | 260/94.1 |
| 3,705,131 | 12/1972 | Korshak et al. | 260/2 H |
| 3,756,982 | 9/1973 | Korshak et al. | 526/285 |

FOREIGN PATENT DOCUMENTS

| 2,043,494 | 5/1971 | Germany. | |
| 129,330 | 9/1960 | U.S.S.R. | 39B/4 |
| 136,552 | 6/1961 | U.S.S.R. | 39C/25 |

OTHER PUBLICATIONS

Billmeyer, Journal of Polymer Science, Part C, No. 8., pp. 161-177 (1965)
Chemical Abstracts, vol. 66, 1967, 18979y, Electrical Conductivity in Some Polyyne Polymers
Chemical Abstracts, vol. 70, 1969, 4875g, Semiconducting Organic Polymers.

*Primary Examiner*—Edward J. Smith

[57] ABSTRACT

A high molecular weight polymer characterized by chains of benzene rings comprising alternatively di-substituted rings and tri-substituted rings, wherein the di-substituted rings comprise a major part of 1,3 (meta)- and a minor part of 1,4 (para)- di-substituted rings, and the tri-substituted rings are members of the group consisting of 1,3,5-, 1,2,4- and mixtures of 1,3,5- and 1,2,4-tri-substituted rings, these tri-substituted rings being substituted by 1 to 3 chains of benzene rings, each of the other substituents being a benzene ring which is unsubstituted or is substituted by a radical of the group consisting of alkyl, aryl and halogen radicals.

1 Claim, 1 Drawing Figure

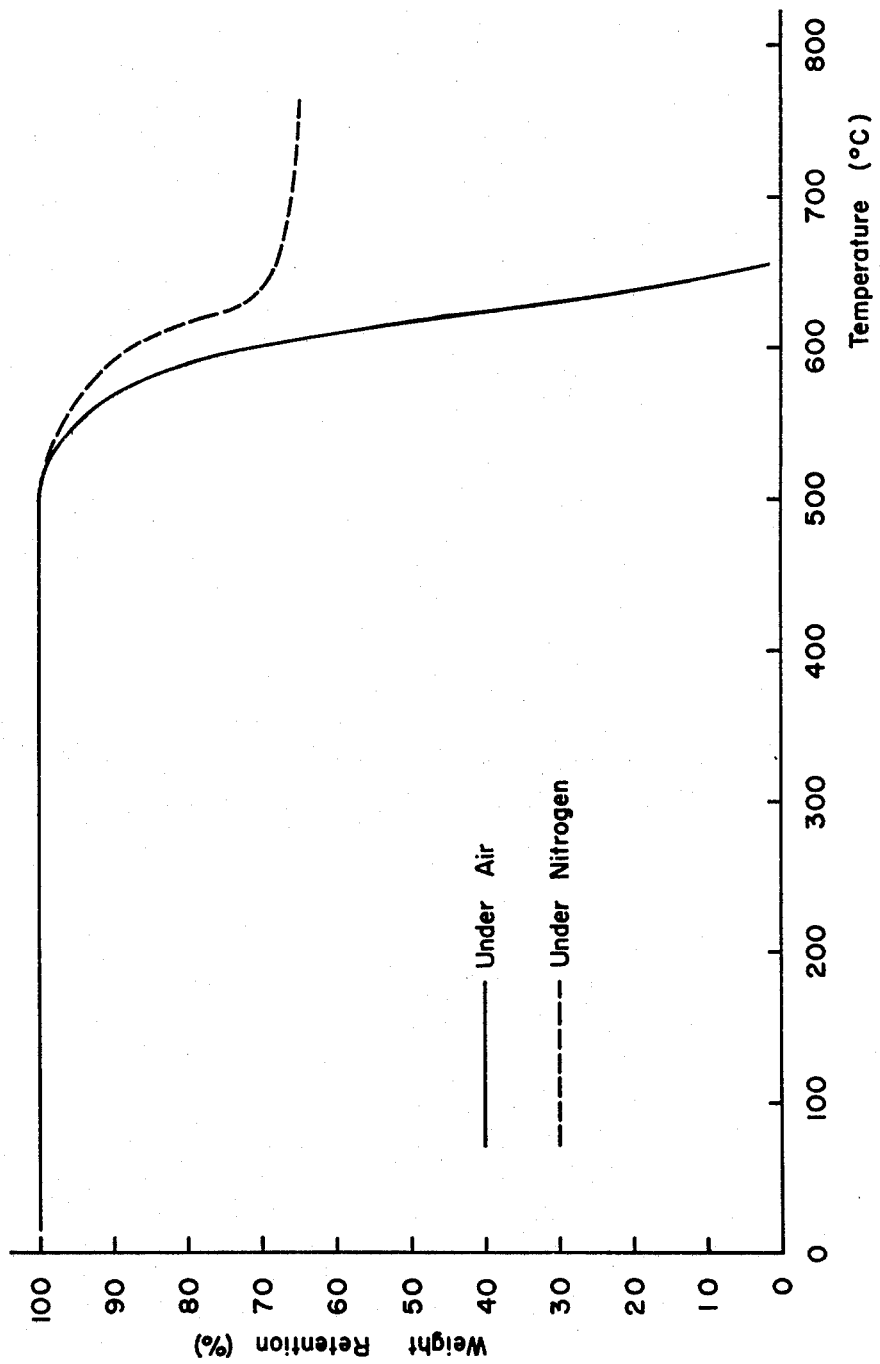

POLYPHENYLENE RESINS

This invention relates to new polymers having a high thermal stability and which are composed of chains of benzenic rings and which display a high molecular weight and a good solubility in conventional solvents.

Much effort has been devoted in recent years to development of polymers having a high thermal stability and good mechanical properties. It is known that a characteristic of aromatic compounds is their thermal stability. Therefore, considerable research work has been directed to the synthesis of polymers containing aromatic rings, their multiple bonds being particularly stable. For example, polyphenylene displaying a very high thermal stability has been prepared by oxidative coupling of benzene. However, this polymer, which is essentially of a para structure, is not soluble and cannot be feasibly processed. Solvent soluble polymers have been prepared from a mixture of terphenyl, biphenyl, triphenylbenzene and benzene. However, the thermosetting resins obtained have been found to have too low a molecular weight, the molecular weight being about 3,000, which adversely influences the mechanical properties of the resins for most uses.

Copolymers have been prepared from aromatic compounds having two rings linked by a polyvalent radical and from unlinked cyclic compounds. The solubility of these copolymers depends on the proportions of the monomers used. Once more, a drawback of these resins is their low molecular weight.

Soluble resins, having a high molecular weight and desirable properties have recently been produced from diethynylbenzene and biscyclopentadienones. However, the process by whch such resins are produced is not as economical as is desirable.

An object of this invention is to provide new polymers with chains of benzene rings, these polymers having a high molecular weight, a very high thermal stability and a good solubility in conventional solvents. An additional object of the present invention is to provide new polymers which can be worked easily. A further object of this invention is to provide a convenient process to produce these polymers from readily available raw materials.

The polymers of the present invention are characterized by chains of benzene rings comprising alternatively di-substituted rings and tri-substituted rings, where the di-substituted rings comprise a major part of 1,3 (meta)- and a minor part of 1,4 (para)-di-substituted rings, and the tri-substituted are members of the group consisting of 1,3,5-, and 1,2,4- and mixtures of 1,3,5- and 1,2,4- tri-substituted rings, these tri-substituted rings being substituted by 1 to 3 chains of benzene rings, each of the other substituents being a benzene ring which may be unsubstituted or substituted by a radical from the group consisting of alkyl aryl and halogen radicals.

According to another feature of the present invention, the present polymers containing chains of benzene rings are produced by a process comprising reacting diethynylbenzene with phenylacetylene, which is ring-substituted or not by a radical from the group consisting of alkyl, aryl and halogen radicals, the proportion of diethynylbenzene in the monomer mixture being between 10 and 80 mole %. This reaction is carried out in the presence of a catalyst useful for the trimerisation of acetylenic compounds, the reaction being carried out in an inert solvent and under inert atmosphere, at a temperature varying from −80° to + 150° C.

The accompanying drawing is a curve illustrating the thermal properties of the polymers of the present invention and presenting a plot of weight retention at various temperatures.

The process of the present invention comprises a polycondensation reaction between diethynylbenzene and phenylacetylene with formation of new benzenic rings from three actylenic groups and formation of chains, which are likely branched, of benzene rings.

Catalysts used in the process of the present invention in the preparation of these new resins from a diacetylenic aromatic compound and a monoacetylenic aromatic compound are catalysts of the type employed for the trimerisation of acetylenic hydrocarbons into aromatic compounds. Such catalysts include complexes of triarylphosphine and nickel carbonyl, such as $[(C_6H_5)_3 P]_2 Ni(CO)_2$. However, the catalyst preferably is a Fischer-type catalyst such as a catalyst having as main components titanium and aluminium, more particularly in the form of a complex, which may be an organo-metallic complex. Such a catalyst is prepared from a tri- or tetravalent titanium compound. A titanium halide may be used, more particularly titanium chloride which is the most available. Titanium compounds also suitable for the process of the present invention are alcoholates, which are most often derived from alcohols containing from 1 to 4 carbon atoms, such as for example titanium ethylate. Other titanium derivatives, namely titanium ester halides, such as diethoxy-titanium dichloride, are also convenient for the manufacture of active catalysts. Aluminium may be used in the form of metallic aluminium or of trialkylaluminium, alkylaluminium halide or aluminium halide, more particularly aluminium trichloride, but in conjunction with one of the preceding compounds.

A particularly easy and convenient process for the manufacture of the catalysts employed in the present invention with inexpensive materials comprises using titanium chloride, aluminium chloride, aluminium, preferably finely divided aluminium, and an aromatic compound, such as benzene or chlorobenzene. The crystalline complex obtained is very soluble in aromatic compounds.

The mixture of monomeric starting materials, i.e. diethynylbenzene and phenylacetylene, may contain from 10 to 80 mole % of diethynylbenzene. It has been found that a mixture containing below 10 mole % of diethynylbenzene gives a polymer with a molecular weight which may be too low for some applications. Usually, the proportion of diethynylbenzene in the mixture is higher than 40 mole %. However, polymers prepared from mixtures containing more than 80 mole % of diethynylbenzene are not soluble or have a reduced solubility in conventional solvents. Monomer mixtures with a diethynylbenzene content between 40 and 70 mole %, and more particularly between 50 and 60 mole %, are preferred for obtaining polymers which have a high molecular weight and a good solubility in conventional solvents. To prevent a substantial reduction of solubility of the polymers, the diethynylbenzene used preferably contains not more than 10% of the para isomer and preferably is the pure meta isomer.

It is known that by adding a difunctional monomer, such as divinylbenzene, in an amount as low as 1%, to a mono-functional monomer, such as styrene, the polymer generally is gelified and insoluble. It is thus surprising and unexpected that a soluble polymer having a high molecular weight, may be obtained by adding a difunctional compound, such as diethynylbenzene, in an amount higher than 40% and which may often reach 70%, to a mono-functional compound such as phenylacetylene.

The influence of the proportion of diethynylbenzene in the mixture of monomers on the molecular weight of the polymer depends on the polymerization temperature. Comparative experiments have shown that, at low polymerization temperature, a mixture of monomers containing for example 56% of diethynylbenzene gives a polymer having a higher molecular weight than that of a polymer prepared from a monomer mixture containing 60% of diethynylbenzene. The reaction temperature may be varied within wide limits from $-80°$ to $+150°$ C. More particularly, this temperature is between $-50°$ and $+80°$ C, which corresponds generally to an initial temperature of about $-50°$ to $+50°$ C, due to the exothermicity of the reaction.

A suitable solvent for the reaction mixture is a member of the group incuding benzene, toluene, xylene, cyclohexane and chlorobenzene. The solvent used is one which is pure, anhydrous and inert in the reaction conditions.

The polymer obtained is separated from the reaction mixture by precipitation with methanol. This polymer is a powder with a light yellow color and has a melting point higher than 250° C which may reach 340° to 350° C. Moreover, the polymer is characterized by:

a. a molecular weight which is at least 5,000 and generally is between 30,000 and 100,000,
b. high thermal stability, no weight loss occurring at temperatures up to 450° to 500° C, even when heating in air,
c. solubility at room temperature in many conventional solvents, namely in chlorinated solvents and aromatic hydrocarbons.

The polymers produced in accordance with the present invention may be dissolved to prepare solutions which can be used in the preparation of heat resistant coatings. When cross-linked, for example by adding disulfonylbenzene $C_6H_4(SO_2Cl)_2$ in an amount which depends on the molecular weight of the polymer and which may be varied from 0.1 to 10% by weight, the polymers are used for the manufacture of molded products for which thermal stability and high mechanical properties are required. In addition, the flexibility of these polymers may also be improved by adding aromatic plasticizers. The following examples are given to illustrate the present invention:

EXAMPLE 1 a. Preparation of the catalyst

A 50 ml. pressure resistant glass tube is filled with 15 ml. of iron balls (7/32 inch), 21 ml. of chlorobenzene and 0.3 g. of aluminium fillings. The mixture is heated in an oil bath and one ml. of chlorobenzene is distilled off, 0.214 g. of aluminium chloride is added and the tube is capped under nitrogen. The tube is vigorously agitated for 24 hours and 0.132 ml. of titanium chloride is then added using a gastight syringe. The system is shaken at 80° C for 24 hours. The catalyst solution so obtained is stored at room temperature under a nitrogen blanket.

b. Polymerization

A 100 ml. glass pressure bottle is filled with 75 ml. of chlorobenzene and a few mls. of solvent are distilled off to remove humidity. The bottle is cooled under nitrogen and 5 ml. of a monomer mixture is introduced. This mixture contains 55 mole % of diethynylbenzene and 45 mole % of phenylacetylene. The bottle is capped and then cooled to $-45°$ C. With a gastight syringe, 2.5 mls. of the catalyst solution are injected into the bottle. The mixture is left at $-45°$ C for 30 minutes, heated up to 0° C during one hour and then raised to room temperature. After 24 hours, the catalyst is deactivated by injecting a solution of 100 mg. of iodine in chlorobenzene followed by one ml. of tetramethylethylenediamine. The bottle is opened, the contents are repeatedly washed with dilute hydrochloric acid to eliminate the catalyst and the polymer is precipitated in methyl alcohol.

The polymer, which is obtained with a yield of 89%, has a vanilla cream color. The inherent viscosity of this polymer (0.5 g. of polymer in 100 ml. of chlorobenzene at 30° C) is 0.29 dl/g. Its molecular weight is 50,000. The infra-red spectrum of this polymer shows the following absorptions: 1600, 1580, 1470, 870, 830, 790, 760 and 690 cm$^{-1}$. The absorption at 870 and, probably, at 830 cm$^{-1}$, is due to substitutions of the 1,3,5-type. The absorptions at 790 and 760 cm$^{-1}$ are respectively due to 1,3-substitution and to a mono-substitution. The absorption at 690 cm$^{-1}$ is common for the three substitution-types. The thermal behavior of this polymer has been determined by thermogravimetric analysis and the results are presented in the attached drawing. The softening point of the polymer is about 340° C.

EXAMPLES 2 TO 5

Example 1 is substantially repeated using a catalyst prepared as described in Example 1 to prepare polymers by reacting during 24 hours, mixtures of m-diethynylbenzene and phenylacetylene. The results are summarized in the following table:

| Example | Starting temperature | Mole% of diethynyl-benzene | Yield | Inherent viscosity |
|---|---|---|---|---|
| 2 | $-35°$ C | 50% | 82% | 0.19 |
| 3 | $-35°$ C | 56% | 88% | 0.43 |
| 4 | $-45°$ C | 60% | — | Gel |
| 5 | $+20°$ C | 60% | 86% | 0.22 |

EXAMPLE 6

Example 1 is again substantially repeated using a mixture of 55 mole % of diethynylbenzene (92% of meta isomer and 8% of para isomer) and 45 mole % of m-chlorophenylacetylene. The polymer, which is obtained with a yield of 83%, has a molecular weight of 48,000.

EXAMPLE 7

Example 1 is again substantially repeated using a mixture of 30 mole % of m-diethynylbenzene and 70 mole % of p-ethylphenylacetylene. The polymer obtained after precipitation in acetone, has a molecular weight higher than 5,000.

What is claimed is:

1. A normally solid, aromatic hydrocarbon soluble polyphenylene polymer prepared by polymerizing a mixture consisting essentially of phenyl acetylene and meta-diethynyl benzene, the mixture containing between 50 and 60 mol percent of meta-diethynyl benzene and 40–50 mol percent of phenyl acetylene, with a catalyst solution prepared from Al, AlCl$_3$, chlorobenzene and TiCl$_4$, in an inert solvent and under inert atmosphere at a temperature of from $-80°$ to 150° C.

* * * * *